(12) United States Patent
Paul et al.

(10) Patent No.: US 7,673,723 B2
(45) Date of Patent: Mar. 9, 2010

(54) CALIPER MOUNTING ARRANGEMENT

(75) Inventors: Scott Andrew Paul, Lake Wylie, SC (US); Donald Burgoon, Gastonia, NC (US)

(73) Assignee: Performance Friction Corporation, Clover, SC (US)

( * ) Notice: Subject to any disclaimer, the term of this patent is extended or adjusted under 35 U.S.C. 154(b) by 567 days.

(21) Appl. No.: 11/536,252

(22) Filed: Sep. 28, 2006

(65) Prior Publication Data

US 2007/0137953 A1    Jun. 21, 2007

Related U.S. Application Data

(60) Provisional application No. 60/752,720, filed on Dec. 21, 2005.

(51) Int. Cl.
*F16D 55/228* (2006.01)
(52) U.S. Cl. .................. 188/73.31; 188/73.39
(58) Field of Classification Search ............. 188/73.31, 188/73.39; 403/364
See application file for complete search history.

(56) References Cited

U.S. PATENT DOCUMENTS

| | | | |
|---|---|---|---|
| 4,537,837 A * | 8/1985 | Gunn et al. ................. 428/621 |
| 5,125,482 A * | 6/1992 | Negishi .................... 188/73.39 |
| 5,660,253 A | 8/1997 | Rike | |
| 6,217,251 B1 * | 4/2001 | Kato et al. .................. 403/364 |
| 6,250,439 B1 * | 6/2001 | Matsuzaki ............... 188/73.31 |
| 6,336,526 B1 * | 1/2002 | Chou .......................... 188/26 |
| 6,416,415 B1 * | 7/2002 | Yu ............................. 403/364 |
| 7,407,043 B2 * | 8/2008 | Fujita et al. .............. 188/73.31 |

FOREIGN PATENT DOCUMENTS

| | | |
|---|---|---|
| EP | 0 971 144 A2 | 1/2000 |
| EP | 1 637 762 A2 | 9/2006 |
| EP | 1 703 163 A2 | 9/2006 |
| JP | 2003065369 | 3/2003 |

* cited by examiner

*Primary Examiner*—Thomas J Williams
(74) *Attorney, Agent, or Firm*—Roberts Mlotkowski Safran & Cole, P.C.; Thomas W. Cole

(57) ABSTRACT

A brake caliper assembly includes a caliper body connected to a torque plate via a mating protrusion and cavity that transfer torque through facing abutment surfaces to reduce twisting of the caliper. The mating protrusion and cavity provide a stiff connection and also allow use of a smaller, lighter connecting bolt. This arrangement eases removal and reinstallation of the caliper.

43 Claims, 11 Drawing Sheets

CALIPER MOUNTING ARRANGEMENT

RELATED APPLICATIONS

This application claims priority from U.S. Provisional Application 60/752,720 filed Dec. 21, 2005. The contents of the provisional application are incorporated herein by reference.

BACKGROUND OF THE INVENTION

1. Field of the Invention

This invention relates to brake calipers for use with disc brakes. In particular, this invention relates to the mounting arrangement of brake calipers to a vehicle support element.

2. Discussion of Related Art

In typical disc brake assemblies, a rotor is mounted on a wheel hub for rotation. One or more pairs of brake pads, generally designed as friction material carried on a backing plate, are supported on either side of the rotor by a caliper or an anchor bracket. Calipers are designed to apply the braking force by moving a piston relative to the rotor to thereby move the brake pad into and out of contact with the rotor. The pistons are supported in a bore in the caliper and abut the backing plate of the brake pad to move the brake pad toward the rotor upon application of a braking force. The caliper can be hydraulically actuated, for example, to selectively press the brake pads against the surface of the rotor to stop the rotation of the rotor, and hence the wheel hub, by forcing hydraulic brake fluid into the piston bore.

A fixed type caliper is rigidly mounted to a fixed mounting member of the vehicle, such as the frame or axle mount. In such a mount, a torque plate is bolted to the caliper body and bolted to the fixed mounting member of the vehicle. The application of braking force to slow or stop the rotating rotor causes a transfer of torque from the rotor through the pads and to the caliper. The force is transferred through the caliper and torque plate to the mounting member. In this type of arrangement, the shear force is transferred through the bolts, which can cause the bolts to bend, even when large bolts are used. Bending of a bolt causes the caliper to twist, which results in many problems. A twisted caliper can cause uneven brake pad wear and uneven rotor wear, which can lead to thermal distortion of the rotor, cracking of the rotor and premature failure of the rotor. Twisting of the caliper can also lead to increased fluid displacement that can cause long pedal phenomenon in which a brake operator experiences a lengthened brake stroke and can also lead to a longer stopping distance. Twisting can also cause the piston carried by the caliper that actuates movement of the brake pads to become lodged in the piston bore.

Additionally, when the caliper needs to be removed and reinstalled, it is difficult to access and manipulate the large bolts needed to withstand the shear forces. This is especially true in cases of medium and heavy duty vehicles.

There is a need for a caliper and torque plate design that provides for a strong connection that has sufficient stiffness to withstand the shear force transferred during braking from a rotor through a caliper. There is also a need for simplified and easier removal and reinstallation of the caliper for service.

SUMMARY OF THE INVENTION

An aspect of the embodiments of the invention relates to providing a connection between a caliper and torque plate that resists twisting.

An aspect of embodiments of the invention is to provide a caliper assembly with a caliper coupled to a torque plate with a durable, stiff connection.

A further aspect of embodiments of the invention is to provide a caliper mounting arrangement that is easy to access and maneuver to aid in removal and reinstallation for service.

These and other aspects of the invention can be realized by embodiments of the invention, which is directed to a brake caliper assembly, comprising a caliper body for supporting a brake pad having a braking surface that selectively engages a brake rotor and a torque plate connected to the caliper body, the torque plate having a mounting member for connection to a vehicle support. One of the caliper body and the torque plate includes a protrusion extending outwardly therefrom and the other of the caliper body and the torque plate includes a cavity that is shaped to correspond to the protrusion and mate therewith so that forces generated during braking are transferred between the caliper body and the torque plate via the protrusion and cavity.

The protrusion and cavity can be formed in a variety of shapes and configurations that provide an abutment surface for the shear forces created by the torque during braking to transfer between the torque plate and the caliper body.

The invention is also directed to a caliper assembly for use with a disc brake system for a vehicle, comprising a caliper body having a bottom surface and a pair of side walls defining a space therebetween for accepting a portion of a brake rotor, a torque plate having a top surface that connects with the bottom surface of the caliper body and having a mounting flange for mounting the caliper assembly to a mounting member, and a fastener fixing the caliper body to the torque plate. One of the bottom surface and the top surface has a protruding member and the other of the bottom surface and the top surface has a corresponding depressed area that mates with the protruding member to form a connection between the caliper body and torque plate through which forces are transferred during braking.

The invention can be further realized in a vehicle brake assembly.

DETAILED DESCRIPTION OF PREFERRED EMBODIMENTS

Figure 1:
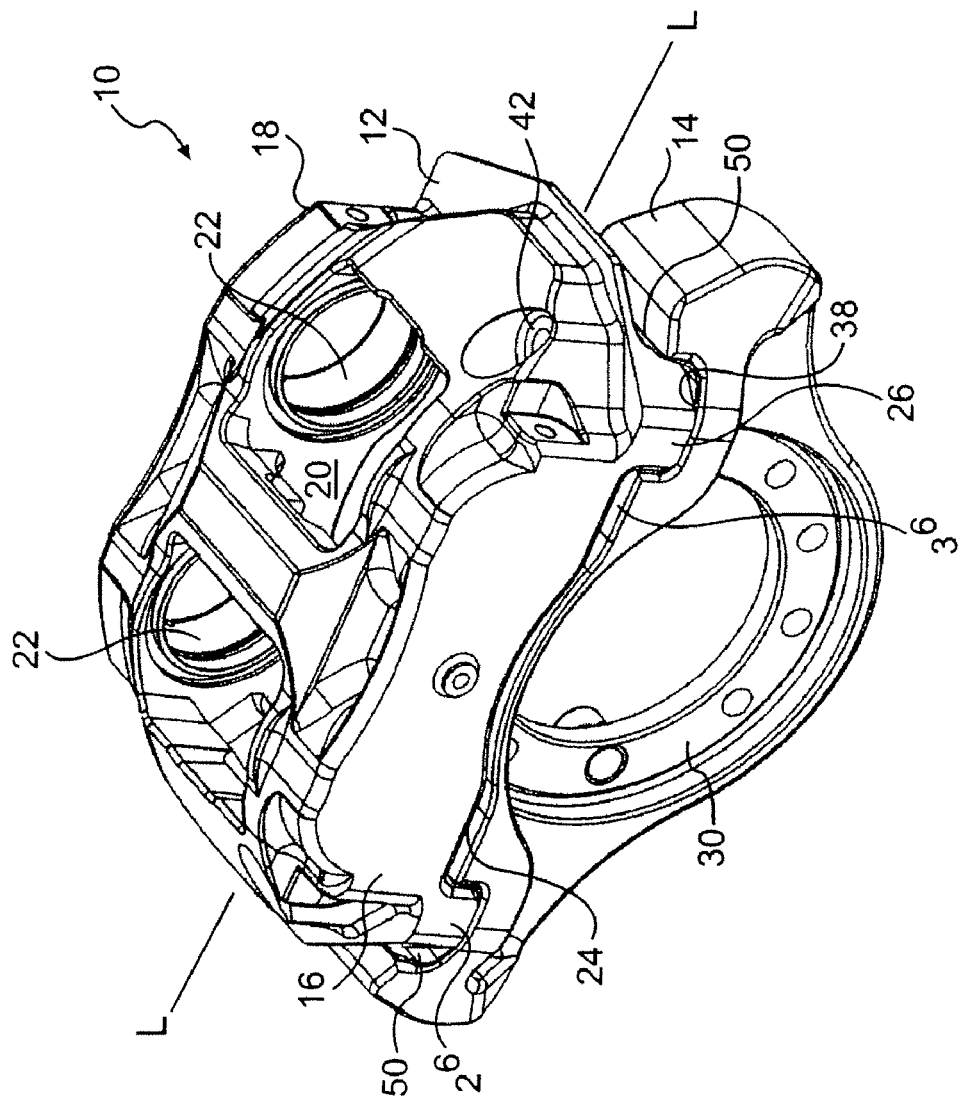
FIG. 1 is a front perspective view of a caliper assembly in accordance with the invention.

In the drawings, like reference numerals in the various figures denote the same element.

This invention is described for use in a vehicular disc brake system. The caliper assembly described below is used for illustrative purposes only and it will be understood that this invention may be used in various types of braking systems and with any rotor. The invention can be used in conventional automobiles, racing vehicles, motorcycles, medium duty vehicles, and heavy duty trucks. As the invention provides an increased ability to withstand high torque applications, it is well suited for vehicles having a gross vehicle weight (GVW) of 11,000 pounds or more, such as in trucks, ambulances, and buses. In the description below, the brake pads, rotor, and fixed mounting member are not shown as they are conventionally known.

Figure 15:
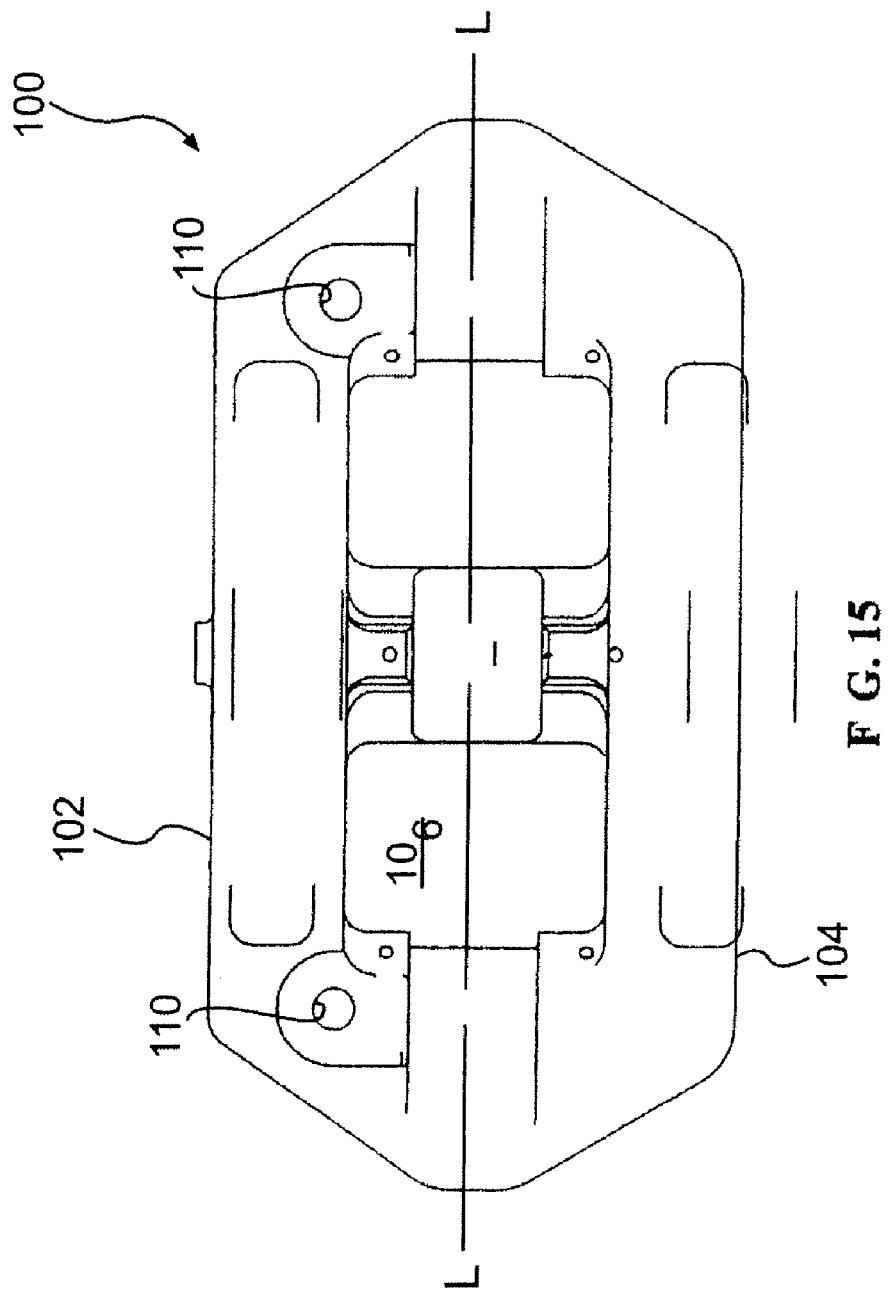
FIG. 15 is a bottom view of a caliper body of a conventional design.
Figure 16:
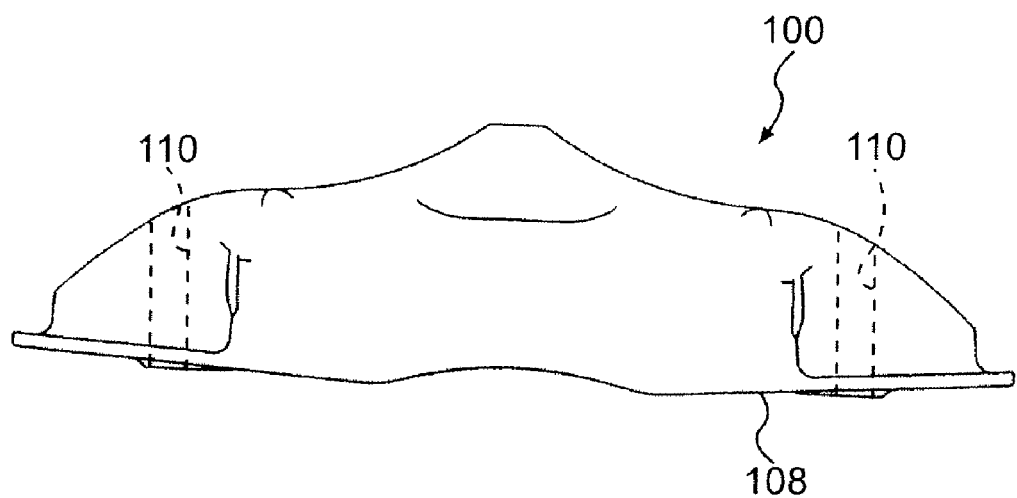
FIG. 16 is a side view of the caliper body of FIG. 15.
Figure 17:
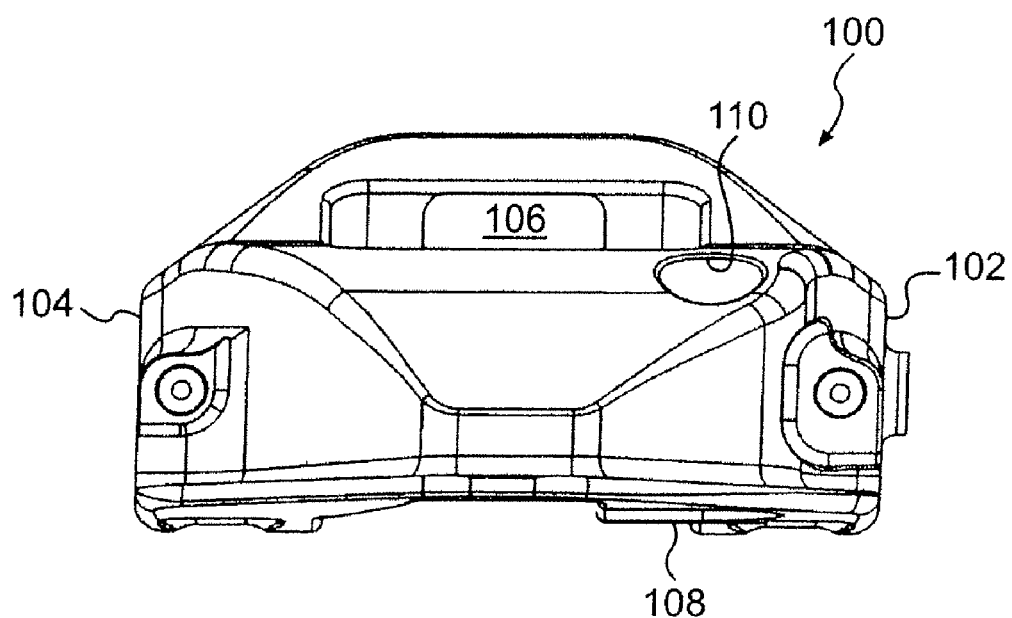
FIG. 17 is a front view of the caliper body of FIG. 16.

Referring to FIGS. 15-17, conventional caliper assemblies use a bolted connection between the caliper body 100 and the torque plate. The caliper body 100 includes two opposed side portions 102 and 104 that extend on either side of a longitudinal axis L. The longitudinal axis L is generally parallel to the plane of the rotor and perpendicular to the axis of rotation of the associated vehicle wheel. A space 106 is defined between the side portions 102 and 104 in which the brake pads are supported. The bottom surface 108 of the caliper body 100 is generally flat. A pair of bolt holes 110 are formed through the caliper body 100 in a direction substantially parallel to the rotor and perpendicular to the axis of rotation that receive large bolts for attaching to a torque plate. The force transferred from the rotor to the brake pads during braking is transferred through the bolts held in bolt holes 110. As the braking force is entirely transferred through the bolts, it can be appreciated that large bolts must be used. Even with large bolts, the shear force tends to bend the bolts, which twists the caliper body. The problems associated with this connection and a twisted caliper, discussed above, lead to numerous performance issues. It is also difficult to access and manipulate the bolts during removal and replacement of the caliper.

In the present invention, seen in FIG. 1, the caliper assembly 10 includes a caliper body 12 and torque plate 14 that are held together by bolts, but use a mating protrusion and cavity connection for the transfer of the shear force from the braking rotor. As explained in detail below, the mating connection allows abutment surfaces on the caliper body 12 and torque plate 14 to experience the shear force from the braking action, instead of the connector bolts, which creates a stiffer, more reliable connection between the caliper body 12 and the mounting member on the vehicle.

Figure 2:
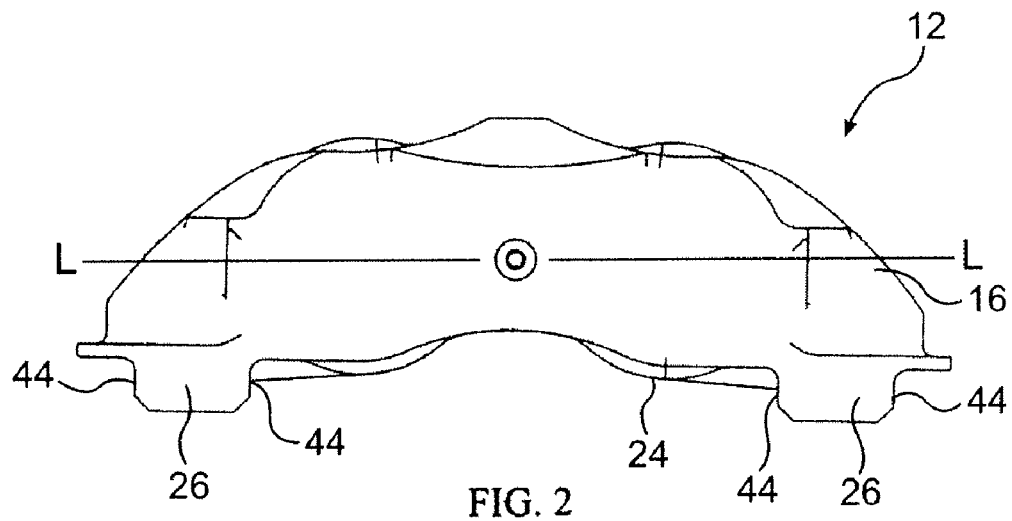
FIG. 2 is a side view of the caliper body of FIG. 1.
Figure 11:
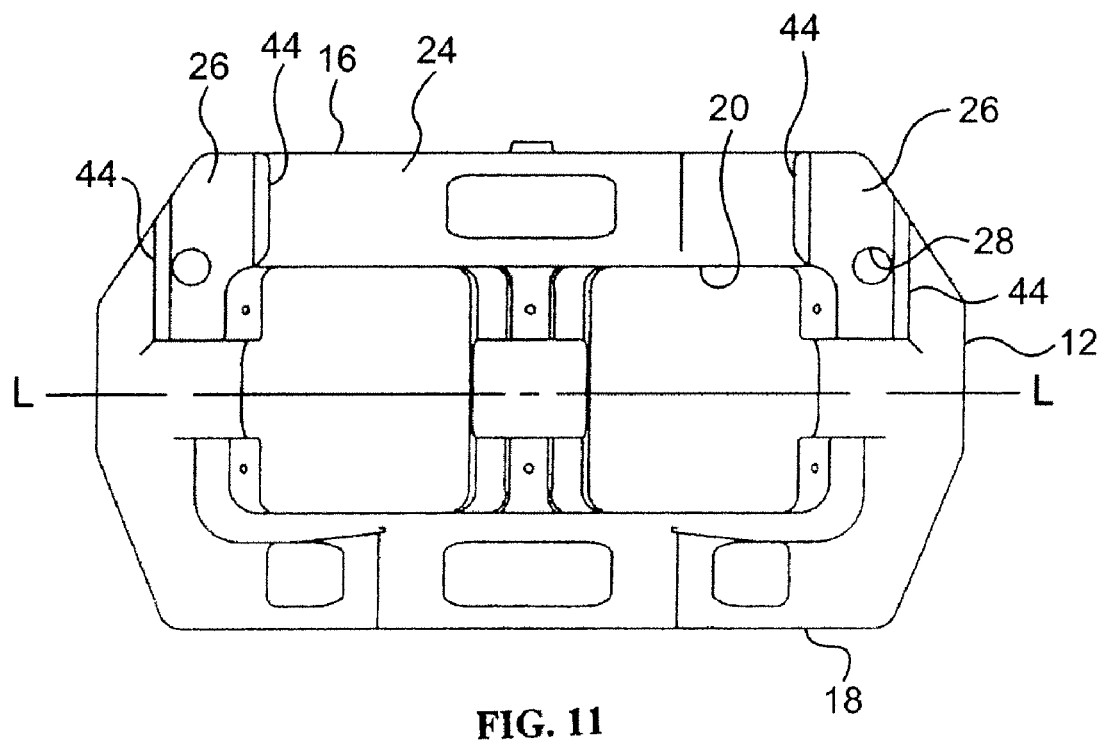
FIG. 11 is a bottom view of the caliper body of FIG. 2.

The caliper body 12 includes a pair of opposed side portions 16 and 18 that define a space 20 therebetween in which the brake pads are mounted, best seen in FIG. 11. The side portions 16 and 18 have bores 22 that receive pistons for actuating the brake pads, as is known. The bottom surface 24 of the caliper body 12 has a pair of protrusions 26 that extend downwardly from the end sections of the side portion 16, as seen in FIG. 2. As seen, the protrusions 26 are generally rectangularly shaped. A pair of bolt holes 28 extends through the protrusion 26, best seen in FIG. 11.

The torque plate 14 has a mounting flange 30 provided with a series of openings 32 to receive bolts for fastening the torque plate 14 to the mounting member, as is known. The mounting flange 30 has a surface that extends generally perpendicular to the axis of rotation of the rotor and generally parallel to the longitudinal axis of the caliper body 12. An ABS sensor can be mounted at opening 34. The top surface 36 of the torque plate 14 is generally flat with a pair of cavities 38 formed at the end sections. The cavities 38 are formed as generally rectangular channels, as seen. A bolt hole 40 extends through each cavity 38.

The protrusions 26 are configured to mate with the cavities 38. The bolt holes 28 align with the bolt holes 40. A fastener 42, such as a bolt, is inserted through each bolt hole 40 and corresponding bolt hole 28 and is secured with a nut on the caliper body side, for example, to connect the caliper body 12 to the torque plate 14. Alternatively, the hole can be tapped into the torque plate 14 and the fastener threaded into hole 28 and hole 40 without a nut. The fasteners 42 connect the caliper body 12 to the torque plate 14 so that they do not become disengaged; but, as explained below, the shear force from the braking action is not transferred through the fasteners 42, as in conventional constructions.

Figure 3:
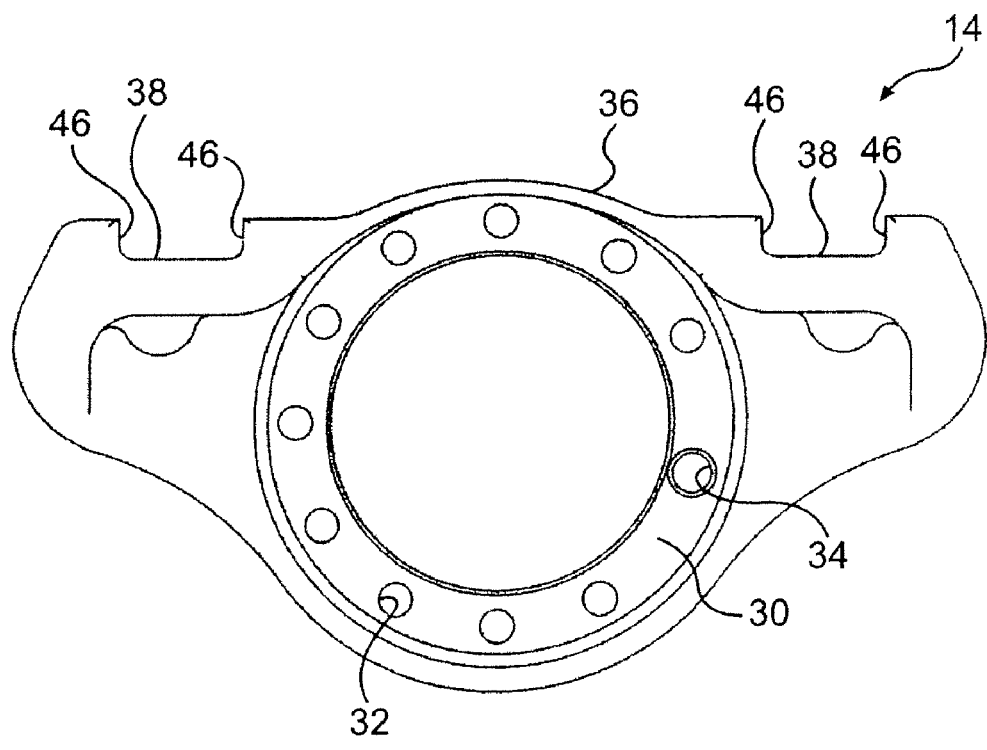
FIG. 3 is a side view of the torque plate of FIG. 1.
Figure 8:
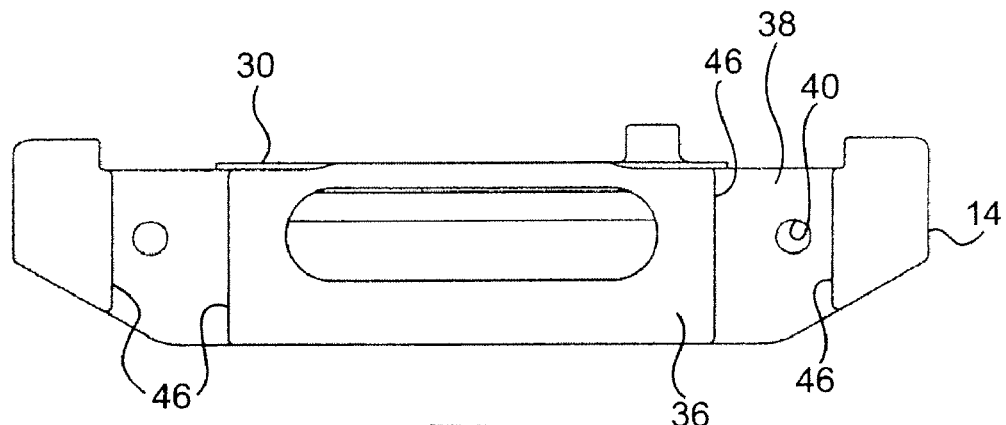
FIG. 8 is a top view of the torque plate of FIG. 3.
Figure 9:
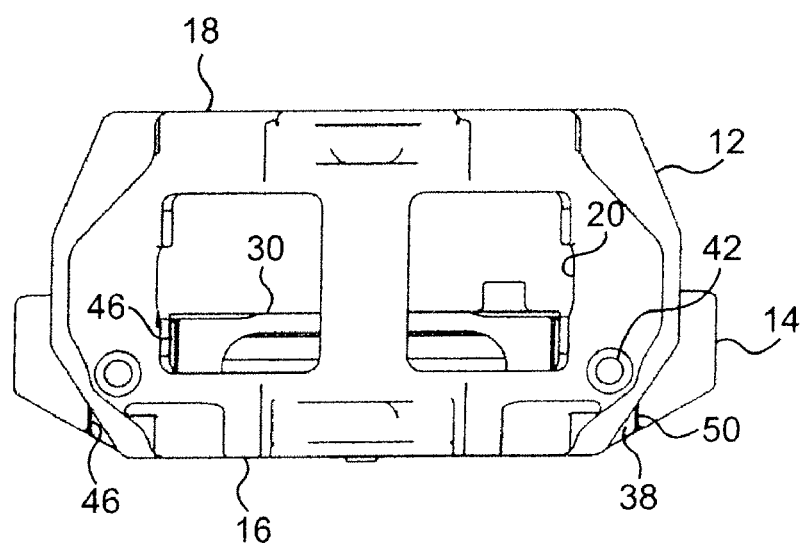
FIG. 9 is a top view of the caliper assembly of FIG. 6.
Figure 10:
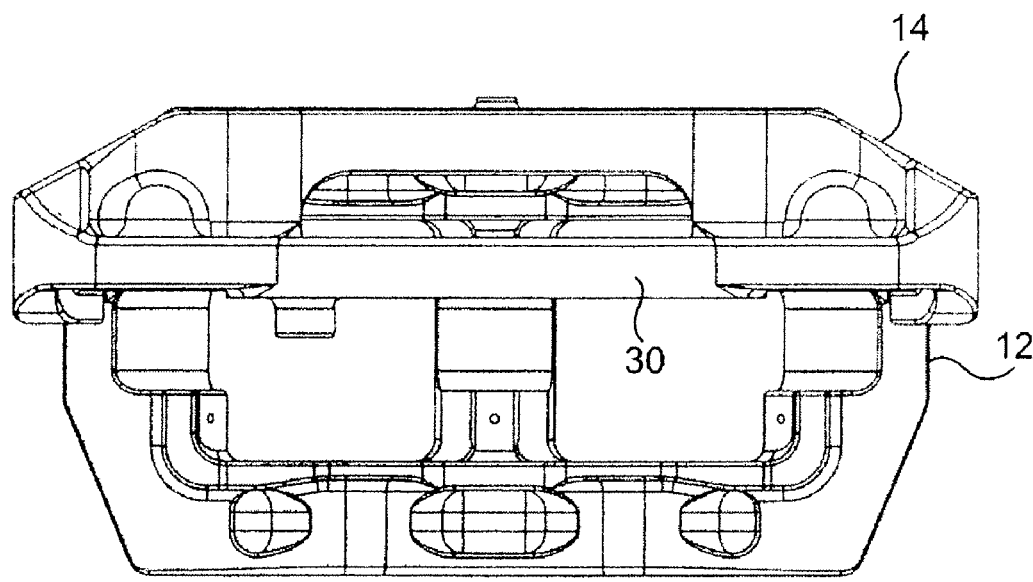
FIG. 10 is a bottom view of the caliper assembly of FIG. 6.

Each protrusion 26 has an abutment surface 44 on each side. The abutment surfaces 44 extend at an angle to the longitudinal axis L, as seen in FIGS. 2 and 11. In other words, the abutment surfaces 44 extend at an angle to the surface of the mounting flange of the torque plate 14. In the embodiment shown, the abutment surfaces 44 extend generally at a 90° angle to the longitudinal axis L of the caliper body 12, but the abutment surfaces 44 could also be formed at an acute or obtuse angle to the longitudinal axis. Each cavity 38 also has an abutment surface 46 on each side. The abutment surfaces 46 extend at an angle to the face of the mounting flange 30, as seen in FIGS. 3 and 8. In the embodiment shown, the abutment surfaces 46 extend generally at a 90° angle to the face of the mounting flange, but the abutment surfaces 46 could also be formed at a different angle that is complementary to the angle of the abutment surfaces 44 of the protrusion 26. The cavity 38 is shaped to extend the width of torque plate 14 and communicate with the rotor space 20, as seen in FIG. 9.

Figure 4:
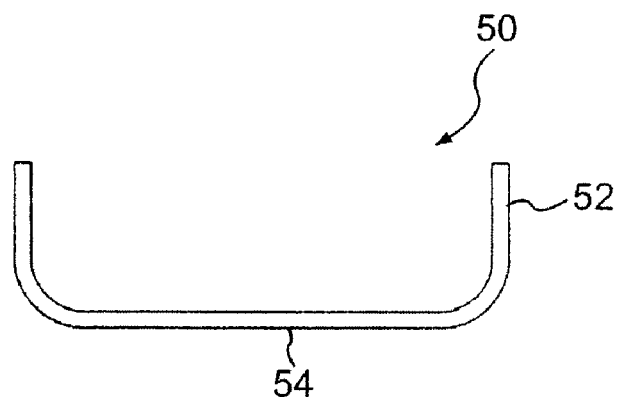
FIG. 4 is an enlarged side view of a clip positioned in the connection between the caliper body and the torque plate.
Figure 5:
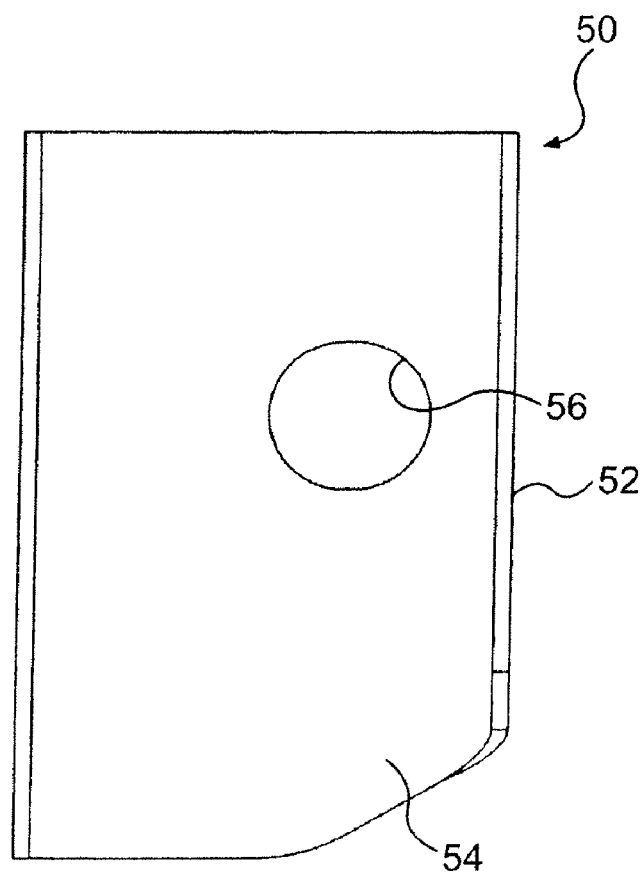
FIG. 5 is a top view of the clip of FIG. 4.
Figure 6:
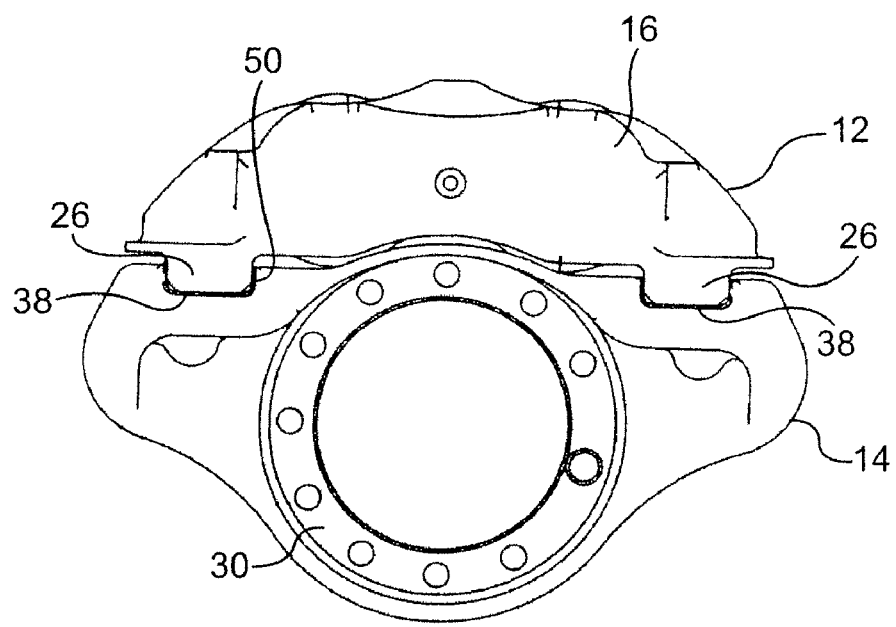
FIG. 6 is a side view of the caliper assembly of FIG. 1.
Figure 7:
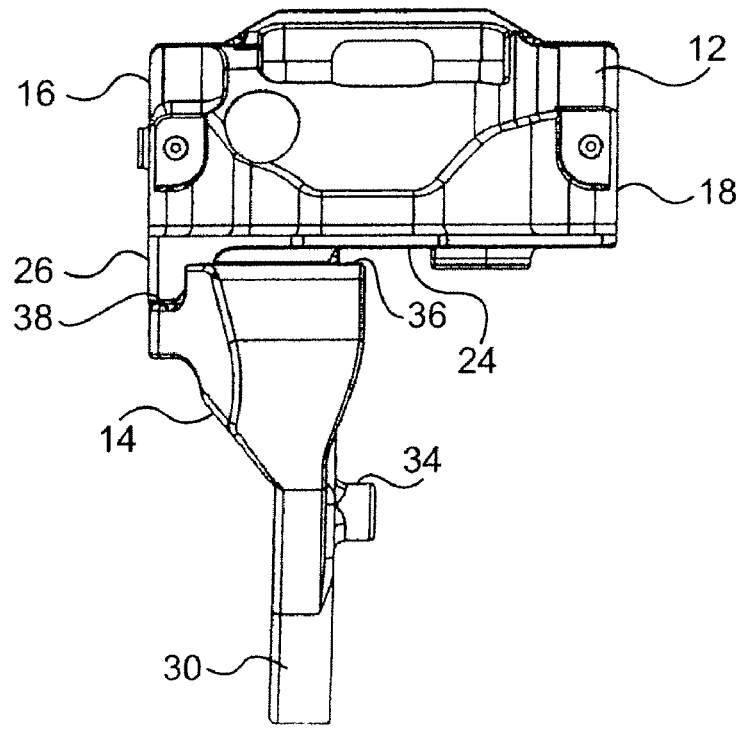
FIG. 7 is a front view of the caliper assembly of FIG. 6.

Optionally, positioned between the protrusion 26 and the cavity 38 is a clip 50, shown in detail in FIGS. 4 and 5. The clip 50 is generally U-shaped with an opposed side walls 52 and a base 54. It is sized to fit snugly within the cavity 38 and extend between the abutment surfaces 44 and 46. The clip 50 has a corresponding bolt hole 56 to align with the bolt holes 28 and 40 to receive bolt 42. Typically, the caliper body 12 and torque plate 14 are made of ductile iron. The clip 50 is made of a more durable material, such as stainless steel to improve the strength of the connection and provide corrosion resistant material between the members.

It is also possible to use a coating or plating rather than the clip 50 between the members to offer a corrosion resistant connection. A suitable coating or plating would be, for example, a zinc-nickel or a zinc-iron material. The material could be provided on either or preferably both adjoining components.

In operation, the brake pads are actuated by the pistons supported by the caliper body 12 to press against the rotor and impede rotation. Torque from the spinning rotor is transferred to the brake pads and through the caliper. Shear force created by the torque is then transferred from the caliper body 12 to the torque plate 14 via the protrusions 26 and cavities 38 through the abutment surfaces 44 and 46. It can be appreciated that the connection formed by the abutment surfaces 44 and 46 is relatively stiff and not susceptible to bending in the way merely a bolt would bend under such force as experienced by conventional connections. Since the bolt is no longer used to transfer the shear force, a smaller bolt can be used. So less torque is required to tighten the bolt, which eases maintenance. This greatly assists in the removal and reinstallation of the caliper since smaller bolts are easier to manipulate and require less force to loosen and tighten.

Of course, the protrusion and cavity can be reversed and function in the same manner. For example, the protrusion can be formed on the torque plate and the cavity can be formed in the caliper body. Additionally, while a pair of protrusions and cavities is shown, any arrangement of protrusions can be used including one large protrusion or a set of three protrusions if desired. Plural protrusions can be aligned or offset to improve the transfer of force. For example, three triangulated protrusions can be provided. The different protrusions and cavities can have parallel abutment surfaces or abutment surfaces disposed at different angles. Further, the protrusions and associated cavities can be formed in a different shape than that shown, as long as an abutment surface is provided. For example, the mating coupling may be rectangular, square, round, oval and angled. Additionally, the protrusion can be integrally formed with the component or be a separate piece that fits into a cavity in the component to as to function as a protrusion.

Figure 12:
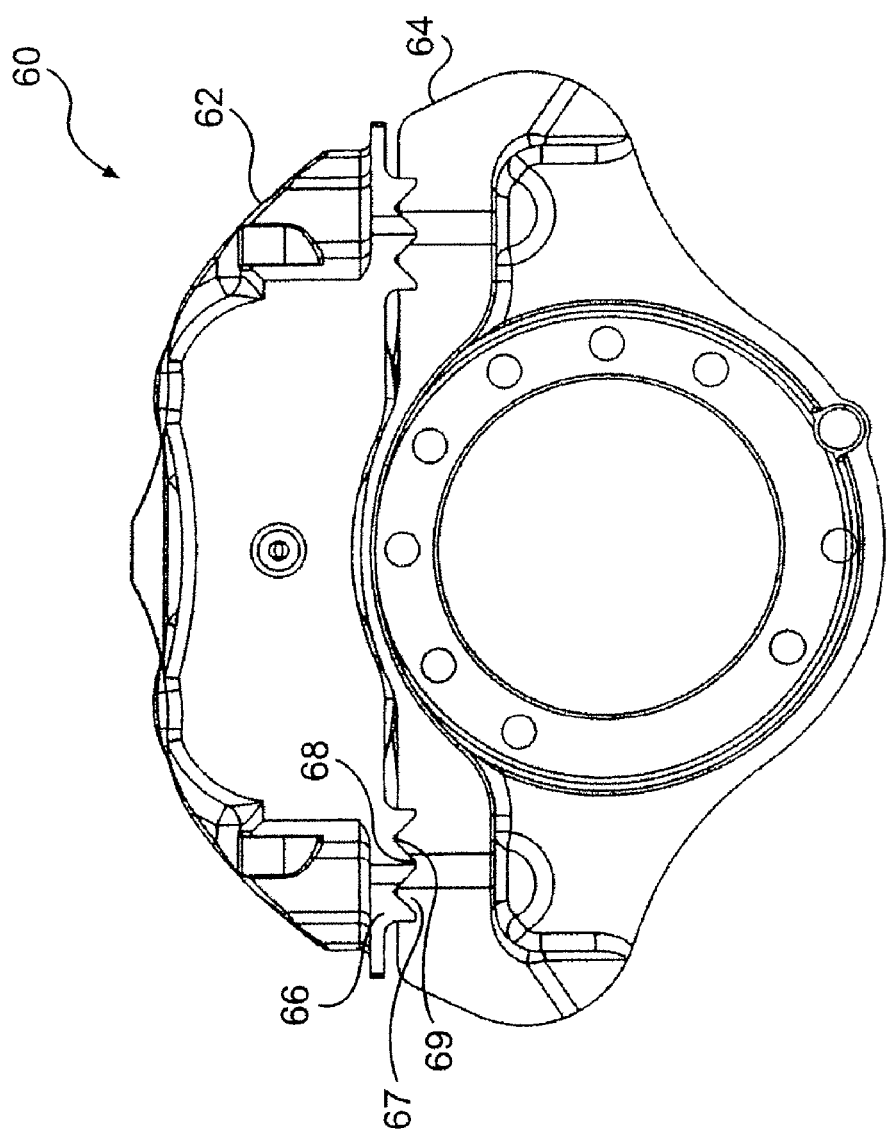
FIG. 12 is a side view of the caliper assembly having a protrusion and cavity in the form of a rack.
Figure 13:
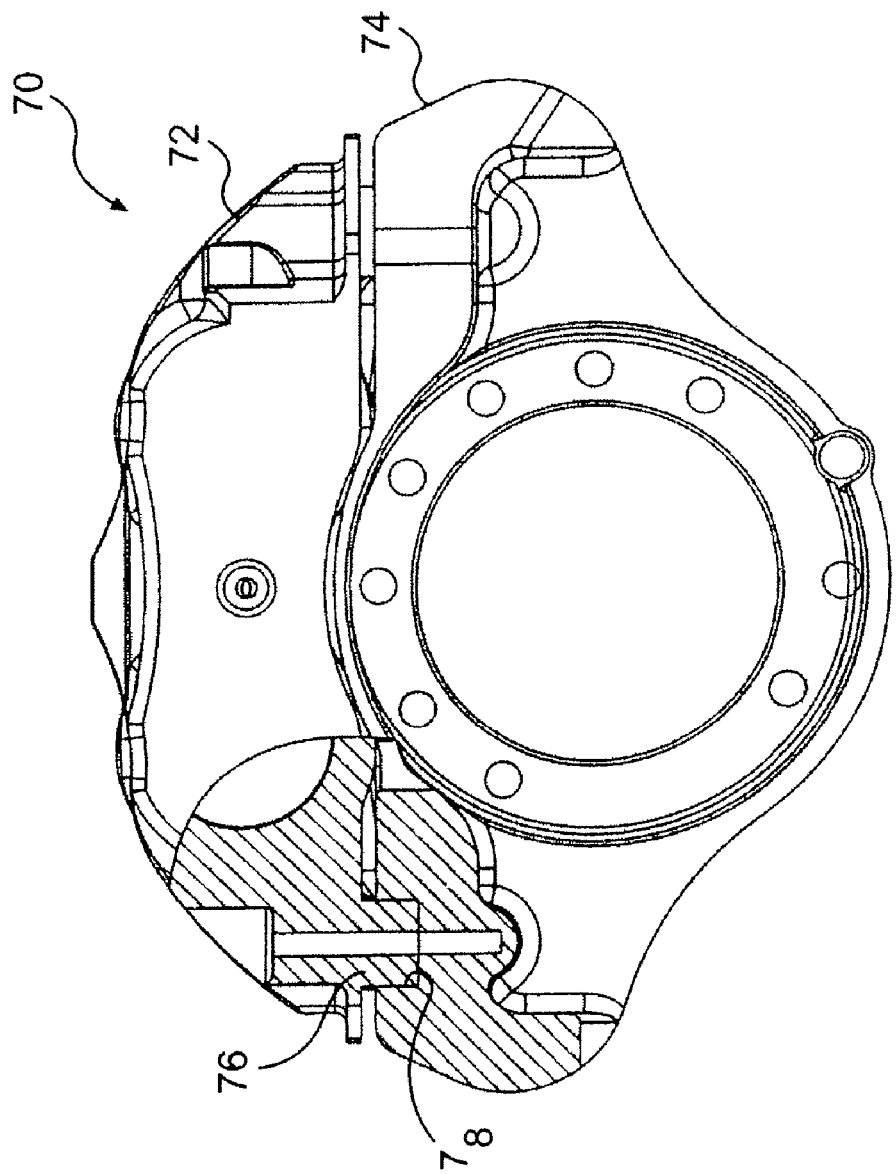
FIG. 13 is a side view of the caliper assembly having a protrusion and cavity in the form of a boss and indent.
Figure 14:
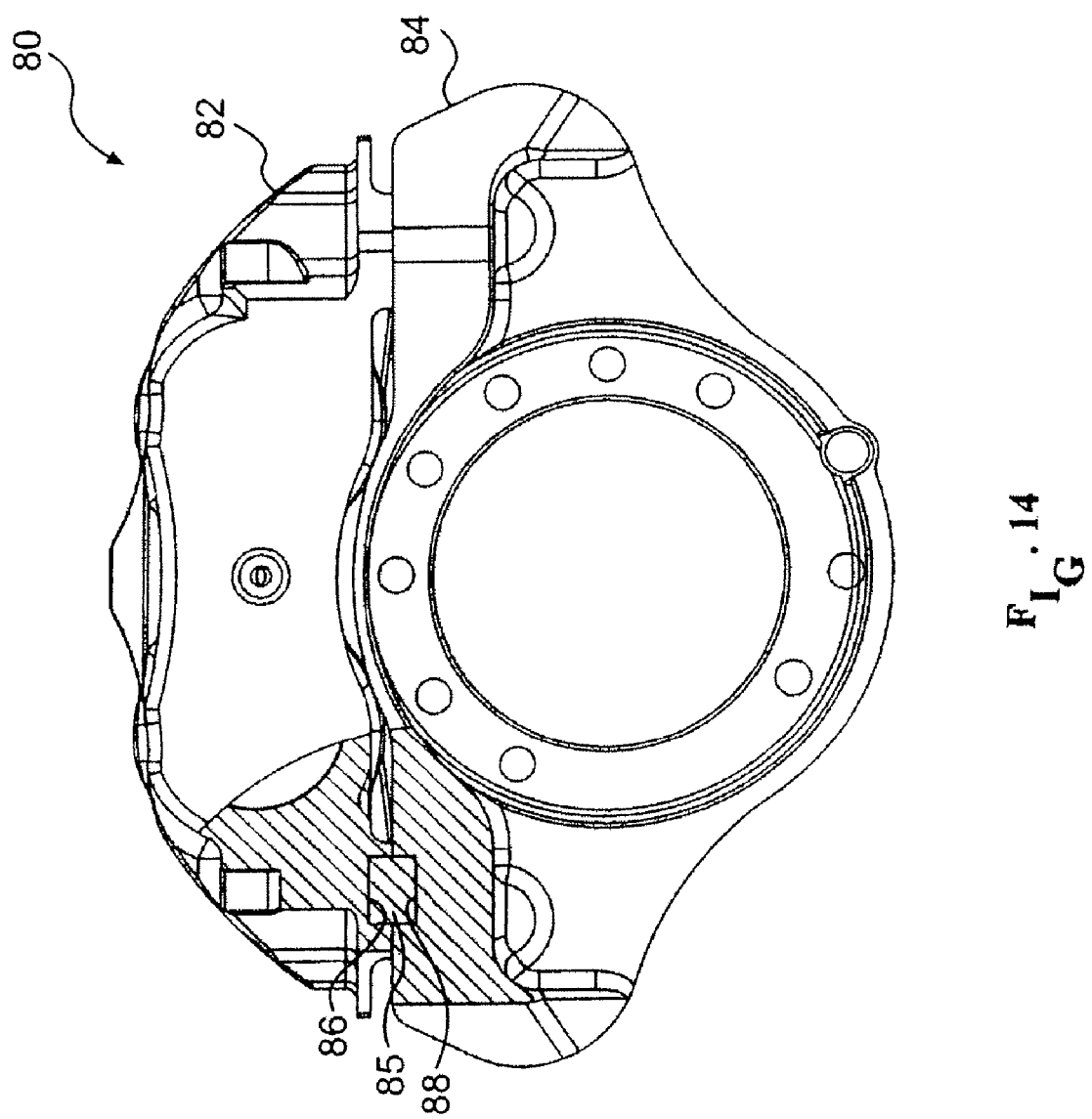
FIG. 14 is a side view of the caliper assembly having a protrusion and cavity in the form of a bushing and groove.

FIGS. 12-14 show examples of differently shaped couplings. As seen in FIG. 12, a caliper assembly 60 includes a caliper body 62 and torque plate 64 with a protrusion and mating cavity configured as a pair of racks 66, 67. Each rack 66, 67 has a plurality of teeth 68, 69 that form peaks and valleys that interlock with the corresponding peaks and valleys of the complementary rack.

FIG. 13 shows a caliper assembly 70 including a caliper body 72 and torque plate 74 with the protrusion and cavity formed as a boss 76 and mating indent 78. The boss 76 and indent 78 can be cylindrical or polygonal.

FIG. 14 shows a caliper assembly 80 including a caliper body 82 and a torque plate 84 with the protrusion and cavity formed as a separate pin or bushing 85 that fits within a mating groove 86 in the caliper body 82 and a mating groove 88 in the torque plate 84. As seen, the bushing 85 is polygonal, such as a bar, and can be a shaped as a square or rectangle. It is also possible to shape the bushing 85 as a rod or pin having a round or oval shape. In this case, the connection bolt hole can be adjacent to the protrusion and cavity rather than extending through it. The coupling can also be made with a stripper bolt.

It will be appreciated by those of ordinary skill in the art that the coupling can be made in a variety of ways as long as a protrusion and cavity form a mating interlock in order to provide abutting surfaces to take the torque rather than the connecting bolt.

It will be understood that the embodiments disclosed herein are illustrative only and that the invention encompasses modifications and changes to the particular design features.

What is claimed is:

1. A brake caliper assembly, comprising:
 a caliper body for supporting a brake pad having a braking surface that selectively engages a brake rotor;
 a torque plate connected to the caliper body, the torque plate having a mounting member for connection to a vehicle support;
 a fastener that fastens the caliper body to the torque plate, and
 wherein one of the caliper body and the torque plate includes at least two protrusions extending outwardly therefrom and the other of the caliper body and the torque plate includes at least two cavities that are shaped to correspond to the protrusions and mate therewith so that forces generated during braking are transferred between the caliper body and the torque plate via the protrusion and cavity and said fastener is isolated from shear forces generated by said braking, and
 wherein each of said protrusions has at least one plane surface that is substantially parallel to an axis of rotation of said brake rotor that, during actuation, engages a plane surface of its respective cavity that is substantially parallel to said axis of rotation of said brake rotor to isolate said fastener from said shear forces.

2. The caliper assembly of claim 1, wherein the protrusions are formed on the caliper body and the cavities are formed in the torque plate.

3. The caliper assembly of claim 1, wherein the protrusions are formed on the torque plate and the cavities are formed in the caliper body.

4. The caliper assembly of claim 1, wherein the protrusions and the cavities each have facing abutment surfaces that are disposed at an angle to the braking surface of the brake pad supported by the caliper body.

5. The caliper assembly of claim 1, wherein the protrusions and the cavities each have facing abutment surfaces that are generally perpendicular to the braking surface of the brake pad supported by the caliper body.

6. The caliper assembly of claim 1, further comprising a clip disposed between the protrusions and the cavities.

7. The caliper assembly of claim 6, wherein the clip is made of stainless steel.

8. The caliper assembly of claim 6, wherein the clip is U-shaped.

9. The caliper assembly of claim 1, wherein at least one of the protrusions and the cavities are coated or plated with corrosion resistant material.

10. The caliper assembly of claim 9, wherein the material is formed on both the protrusions and the cavities.

11. The caliper assembly of claim 9, wherein the material is formed of zinc-nickel.

12. The caliper assembly of claim 9, wherein the material is formed of zinc-iron.

13. The caliper assembly of claim 1, wherein a bolt hole extends through the protrusions and the cavities.

14. The caliper assembly of claim 1, in combination with a vehicle.

15. The caliper assembly of claim 1, in combination with a vehicle having a gross vehicle weight of at least 11,000 pounds.

16. The caliper assembly of claim 1, wherein each protrusion is a generally rectangular member and each cavity is a generally rectangular channel.

17. The caliper assembly of claim 1, wherein each protrusion is formed as a toothed rack and each cavity is formed as a toothed rack and the teeth interlock to form a mating connection.

18. The caliper assembly of claim 1, wherein each protrusion is a boss and each cavity is an indent.

19. The caliper assembly of claim 18, wherein each boss and indent are generally cylindrical.

20. The caliper assembly of claim 18, wherein each boss and indent are generally polygonal.

21. The caliper assembly of claim 1, wherein each protrusion is integrally formed with the caliper body.

22. The caliper assembly of claim 1, wherein each protrusion is integrally formed with the torque plate.

23. The caliper assembly of claim 1, wherein each protrusion is a separate piece that mates with one of the caliper body and torque plate to function as a protrusion.

24. The caliper assembly of claim 1, wherein each protrusion is a bushing and each cavity is a groove.

25. The caliper assembly of claim 24, wherein each bushing is formed as a bar.

26. The caliper assembly of claim 24, wherein each bushing is formed as a rod.

27. The caliper assembly of claim 24, wherein each bushing is a separate piece that is mounted in a corresponding groove formed in the associated caliper body or torque plate.

28. A caliper assembly for use with a disc brake system for a vehicle, comprising:
   a caliper body having a bottom surface and a pair of side walls defining a space therebetween for accepting a portion of a brake rotor;
   a torque plate having a top surface that connects with the bottom surface of the caliper body and having a mounting flange for mounting the caliper assembly to a fixed mounting member; and,
   a fastener fixing the caliper body to the torque plate;
   means for isolating said fastener from shear forces caused by relative flexing between the caliper body and torque plate during a braking operation including at least two protruding members extending from one of the bottom surface and the top surface and at least two corresponding depressed areas located in the other of the bottom surface and the top surface that mate with the protruding members to form a connection between the caliper body and torque plate through which shear forces are transferred during braking, and
   a corrosion resistant clip disposed between the protruding members and the depressed areas,
   wherein each said of said protrusions has at least one plane surface that is substantially parallel to an axis of rotation of said brake rotor that, during actuation, engages a plane surface of its respective cavity that is substantially parallel to said axis of rotation of said brake rotor to isolate said fastener from said shear forces.

29. The caliper assembly of claim 28, wherein at least one of the protruding members and the depressed area is coated or plated with corrosion resistant material.

30. The caliper assembly of claim 28, wherein the protruding members and the depressed areas each have abutment surfaces that face each other, wherein the abutment surfaces are oriented at an angle with respect to the mounting flange.

31. The caliper assembly of claim 28, wherein the protruding members are generally rectangular members and the depressed areas are generally rectangular channels.

32. The caliper assembly of claim 28, wherein the protruding members are formed as a toothed rack and the depressed areas are formed as a toothed rack and the teeth interlock to form a mating connection.

33. The caliper assembly of claim 28, wherein the protruding members are bosses and the depressed areas are indents.

34. The caliper assembly of claim 33, wherein the bosses and the indents are generally cylindrical.

35. The caliper assembly of claim 33, wherein the bosses and the indents are generally polygonal.

36. The caliper assembly of claim 28, wherein the protruding members are integrally formed with the caliper body.

37. The caliper assembly of claim 28, wherein the protruding members are integrally formed with the torque plate.

38. The caliper assembly of claim 28, wherein each of the protruding members is a separate piece that mates with one of the caliper body and torque plate to function as a protrusion.

39. The caliper assembly of claim 28, wherein each of the protruding members is a bushing and each of the depressed areas is a groove.

40. The caliper assembly of claim 39, wherein the bushing is formed as a bar.

41. The caliper assembly of claim 39, wherein the bushing is formed a rod.

42. The caliper assembly of claim 39, wherein the bushing a separate piece that is mounted in a corresponding groove formed in the associated caliper body or torque plate.

43. The caliper assembly of claim 28, in combination with a vehicle.

* * * * *